United States Patent
Quist et al.

(10) Patent No.: US 7,224,324 B2
(45) Date of Patent: May 29, 2007

(54) INTERACTIVE AUTOMOTIVE REARVISION SYSTEM

(75) Inventors: Chad D. Quist, West Olive, MI (US); Francis O'Brien, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 334 days.

(21) Appl. No.: 09/817,874

(22) Filed: Mar. 26, 2001

(65) Prior Publication Data

US 2002/0044065 A1 Apr. 18, 2002

Related U.S. Application Data

(60) Provisional application No. 60/192,721, filed on Mar. 27, 2000.

(51) Int. Cl.
*G09G 5/00* (2006.01)
*G08G 5/00* (2006.01)

(52) U.S. Cl. .............. 345/7; 345/174; 178/18.06; 359/267; 701/213; D12/187

(58) Field of Classification Search ............. 345/7–9, 345/173–183; 178/18.01–18.11, 19.01–19.07; 359/839, 838, 263, 265, 602, 267; 349/113, 349/142, 149, 151; 340/815.4, 973; 701/203, 701/207
See application file for complete search history.

(56) References Cited

U.S. PATENT DOCUMENTS

| | | | |
|---|---|---|---|
| 2,414,223 A | 1/1947 | De Virgilis | 240/4.2 |
| 3,004,473 A | 10/1961 | Arthur et al. | 88/77 |
| 3,075,430 A | 1/1963 | Woodward et al. | 88/77 |
| 3,152,216 A | 10/1964 | Woodward | 88/77 |
| 3,467,465 A | 9/1969 | Van Noord | 350/281 |
| 3,543,018 A | 11/1970 | Barcus et al. | 240/4.2 |
| 3,870,404 A | 3/1975 | Wilson et al. | 350/281 |
| 3,978,190 A | 8/1976 | Kurz, Jr. et al. | 264/242 |
| 4,202,607 A * | 5/1980 | Washizuka et al. | 350/338 |
| 4,435,042 A | 3/1984 | Wood et al. | 350/281 |
| 4,436,371 A | 3/1984 | Wood et al. | 350/281 |
| 4,443,057 A | 4/1984 | Bauer et al. | 350/281 |
| 4,588,267 A | 5/1986 | Pastore | 350/600 |
| 4,646,210 A | 2/1987 | Skogler et al. | 362/142 |
| D289,989 S | 5/1987 | Skogler et al. | D12/188 |
| 4,707,570 A * | 11/1987 | Ide et al. | 178/18 |
| 4,733,336 A | 3/1988 | Skogler et al. | 362/142 |
| 4,807,096 A | 2/1989 | Skogler et al. | 362/142 |

(Continued)

FOREIGN PATENT DOCUMENTS

EP 615882 A2 9/1994

(Continued)

*Primary Examiner*—Lun-Yi Lao
(74) *Attorney, Agent, or Firm*—Van Dyke, Gardner, Linn & Burkhart, LLP (57) ABSTRACT

A vehicular mirror system includes a mirror assembly with a mirror casing and a reflective element with a rearward field of view when the mirror assembly is mounted to a vehicle. The mirror casing includes a mounting portion that is adapted to mount the mirror casing to the vehicle. At least one user-actuatable selector element is provided at the reflective element for access by a driver of the vehicle. The mirror assembly further includes at least one display element that is actuatable to display at least one image in response to the selector element being actuated.

46 Claims, 4 Drawing Sheets

U.S. PATENT DOCUMENTS

| | | | | |
|---|---|---|---|---|
| 4,826,289 A | 5/1989 | Vandenbrink et al. | ...... | 350/281 |
| 4,882,565 A | 11/1989 | Gallmeyer | .................. | 340/461 |
| 4,936,533 A | 6/1990 | Adams et al. | ........... | 248/222.1 |
| 4,948,242 A | 8/1990 | Desmond et al. | ........... | 350/637 |
| 5,100,095 A | 3/1992 | Haan et al. | ................. | 248/549 |
| 5,178,448 A | 1/1993 | Adams et al. | ............. | 362/83.1 |
| 5,253,109 A | 10/1993 | O'Farrell et al. | ........... | 359/604 |
| 5,285,060 A | 2/1994 | Larson et al. | ............... | 250/214 |
| 5,327,288 A | 7/1994 | Wellington et al. | ......... | 359/606 |
| 5,406,414 A | 4/1995 | O'Farrell et al. | ........... | 359/604 |
| 5,416,313 A * | 5/1995 | Larson et al. | ............... | 359/839 |
| 5,487,522 A | 1/1996 | Hook | ......................... | 248/549 |
| 5,521,760 A | 5/1996 | De Young et al. | ........... | 359/601 |
| 5,530,240 A | 6/1996 | Larson et al. | ............... | 250/214 |
| 5,566,224 A | 10/1996 | ul Azam et al. | ............... | 379/58 |
| 5,572,354 A | 11/1996 | Desmond et al. | ........... | 359/265 |
| 5,576,687 A | 11/1996 | Blank et al. | ................ | 340/438 |
| 5,615,857 A | 4/1997 | Hook | ......................... | 248/549 |
| 5,649,756 A | 7/1997 | Adams et al. | ............. | 362/83.1 |
| 5,669,698 A | 9/1997 | Veldman et al. | ........... | 362/83.1 |
| 5,671,996 A | 9/1997 | Bos et al. | ................. | 362/83.1 |
| 5,673,994 A | 10/1997 | Fant, Jr. et al. | | |
| 5,708,410 A | 1/1998 | Blank et al. | ................ | 340/438 |
| 5,708,804 A * | 1/1998 | Goodwin et al. | ........... | 395/603 |
| 5,760,962 A | 6/1998 | Schofield et al. | ........... | 359/604 |
| 5,786,772 A * | 7/1998 | Schofield et al. | ........... | 340/903 |
| 5,798,575 A | 8/1998 | O'Farrell et al. | ........... | 307/10.1 |
| 5,798,688 A | 8/1998 | Schofield | .................... | 340/438 |
| 5,812,321 A | 9/1998 | Schierbeek et al. | ......... | 359/601 |
| 5,813,745 A | 9/1998 | Fant, Jr. et al. | ............. | 362/83.1 |
| 5,820,245 A | 10/1998 | Desmond et al. | .......... | 362/83.1 |
| 5,877,897 A | 3/1999 | Schofield et al. | ........... | 359/604 |
| 5,878,353 A | 3/1999 | ul Azam et al. | ............. | 455/550 |
| 5,929,786 A | 7/1999 | Schofield et al. | ............ | 340/903 |
| 5,938,321 A | 8/1999 | Bos et al. | .................... | 362/494 |
| 5,971,552 A | 10/1999 | O'Farrell et al. | ........... | 359/871 |
| 6,000,823 A | 12/1999 | Desmond et al. | ........... | 362/494 |
| 6,005,538 A | 12/1999 | Hoekstra | ...................... | 345/47 |
| 6,042,253 A | 3/2000 | Fant, Jr. et al. | ............. | 362/494 |
| 6,091,376 A * | 7/2000 | Takekawa | ....................... | 345/7 |
| 6,124,647 A | 9/2000 | Marcus et al. | ............ | 307/10.1 |
| 6,124,886 A | 9/2000 | DeLine et al. | ............... | 348/148 |
| 6,158,655 A | 12/2000 | DeVries, Jr. et al. | ....... | 235/380 |
| 6,172,613 B1 | 1/2001 | DeLine et al. | ........... | 340/815.4 |
| 6,175,164 B1 | 1/2001 | O'Farrell et al. | ........... | 307/10.1 |
| 6,183,119 B1 | 2/2001 | Desmond et al. | ........... | 362/494 |
| 6,198,409 B1 | 3/2001 | Schofield et al. | ........... | 340/903 |
| 6,222,447 B1 | 4/2001 | Schofield et al. | ........... | 340/461 |
| 6,222,460 B1 | 4/2001 | DeLine et al. | ........... | 340/815.4 |
| 6,243,003 B1 | 6/2001 | DeLine et al. | ........... | 340/425.5 |
| 6,262,831 B1 * | 7/2001 | Bauer et al. | ................ | 359/265 |
| 6,314,302 B1 * | 11/2001 | Hafebeck et al. | ........... | 455/550 |
| 6,332,024 B1 * | 12/2001 | Inoue et al. | ........... | 379/433.06 |
| 6,477,464 B2 * | 11/2002 | McCarthy et al. | ......... | 701/213 |
| 6,497,368 B1 * | 12/2002 | Friend et al. | ........... | 235/472.01 |
| 6,889,064 B2 * | 5/2005 | Baratono et al. | ........ | 455/569.2 |

FOREIGN PATENT DOCUMENTS

| | | |
|---|---|---|
| GB | 2192370 A | 1/1988 |
| GB | 2292857 A | 3/1996 |
| GB | 2297632 A | 8/1996 |
| JP | 58180347 | 10/1983 |
| WO | WO 8202448 | 7/1982 |

* cited by examiner

INTERACTIVE AUTOMOTIVE REARVISION SYSTEM

This application claims priority from pending U.S. provisional Pat. application entitled INTERACTIVE AUTOMOTIVE REARVISION SYSTEM, filed Mar. 27, 2000, Ser. No. 60/192,721, the disclosure of which is hereby incorporated herein by reference in its entirety.

TECHNICAL FIELD AND BACKGROUND OF THE INVENTION

The interior rearview mirror assembly is a particularly good location in the vehicle cabin to locate an information display or to locate a user interface device, such as a manually actuated button.

However, the driving task for a vehicle is complex. Presentation to, use of and assimilation by the driver of a plurality of input buttons and/or displays is challenging for the driver. Also, the user interface area/display area available at the rearview mirror location is finite, and may not be able to optimally accommodate all the functions, displays and interfaces desired to be located at, on or within the interior rearview mirror assembly. Thus, an objective of this present invention is to provide an interactive rearview mirror assembly that allows the driver to readily and safely access a plurality of displays and functions in a manner that is convenient to the driver and such that the rearview mirror assembly functions well both as a display/interface location and as a rear vision device that provides a rearward field of view adequate for safe driving on a highway.

SUMMARY OF INVENTION

According to the present invention, an interactive interior mirror system is provided that maximizes the driver's (or other occupants of the vehicle) ability to engage in activities or be informed relative to some information, internal or external to the vehicle, while minimizing the distraction the driver.

In one form of the invention, a vehicular mirror system includes a mirror assembly with a mirror casing having a reflective element with a rearward field of view when the mirror assembly is mounted to a vehicle. The mirror casing includes a mounting portion that is adapted to mount the mirror casing to the vehicle. At least one user-actuatable selector element is provided at the reflective element for access by a driver of the vehicle. The mirror assembly further includes at least one display element, which is actuatable to display at least one image in response to the selector element being actuated by the driver.

In one aspect, the selector element comprises a touch actuatable element. In further aspects, the mirror assembly includes a plurality of the selector elements. Optionally each selector element is associated with a function or a family of functions and, most preferably, a family of related functions or a plurality of a family of functions. The functions may include (i) telephone information, including video teleconferencing or telematics images (ii) highway status information, (iii) blind spot information, (iv) hazard warning information, including train approaching information or warning, (v) vehicle status information, (vi) page messaging information, (vii) speedometer information, (viii) tachometer display, (ix) remote transaction information, including toll transaction information, (x) audio system information, (xi) fuel gauge information, (xii) heater control information, (xiii) air conditioning system information, (xiv) status of inflation of tires information, (xv) trailer tow image information, (xvi) e-mail message information, (xvii) compass information, (xviiii) engine coolant temperature information, (xix) oil pressure information, (xx) cellular phone operation information, (xxi) global positioning system information (GPS), (xxii) weather information, (xxiii) temperature information, including internal and external temperature information, (xxiv) traffic information, (xxv) telephone number information, (xxvi) fuel status information, (xxvii) battery condition information, (xxviii) time information, including time zone information, (ixxx) stock information, or the like. Optionally, the selector element is re-configurable so that the selector elements may be customized to suit the particular driver's needs. For example, one of the selector elements may comprise a function setting selector for the other selector elements or the selector elements may be reconfigured using an onboard computer.

For example, more than one of the selector elements may actuate a display element whereby the display element associated with the interior rear view mirror assembly may display more than one type of image. For example, the display element may display video images in response to a telematics selector element, a camera selector element, such as a baby minder selector element, a forward vision selector element, a rear vision selector, a blind spot or reverse aid selector element, or scrolling information, such as stock quotes, weather information, page messaging information, email information, video conferencing, such as by a video phone, vehicle information status or the like, in response to a stock quote selector element, a weather selector element, a page messaging selector element, a GPS/navigation system information selector element, an email selector element, or a vehicle status selector element being actuated.

In one aspect, the selector elements comprise touch sensitive elements, such as backlit touch sensitive elements. For example, the touch sensitive elements may include associated therewith a display element. For example, a display element may be mounted to an outer surface of the reflective element with the touch sensitive element mounted over the display element. More preferably, the display element may be mounted to an inner surface of a reflective element with a touch sensitive element mounted over a portion of the reflective element over the display element or in proximate association therewith. In another form, the selector elements are mounted to the mirror casing, such as at the bezel or perimeter portion of the mirror casing which extends around the reflective element or may be mounted in a mirror mount or an accessory module associated with or proximate to the mirror assembly.

According to another form of the invention, an interactive vehicular mirror system includes an interior rearview mirror assembly, a display element, and a user actuatable selector element. The interior rearview mirror assembly includes a mirror casing and a reflective element and is adapted to mount to an interior portion of a vehicle, with the reflective element having a rearward field of view when the interior rearview mirror assembly is mounted to the vehicle. The user actuatable selector element is associated with a function and is provided at the reflective element, with the selector element activating the display element to display an image associated with the function of the selector element when the selector element is actuated. The display element is provided at the interior rearview mirror assembly.

In one aspect, the selector element is provided on an outer surface of the reflective element. For example, the selector element may be located at a lower portion of the reflective element, including a lower perimeter portion of the reflective element.

In another aspect, the display element is re-configurable whereby the display element may be associated with more than one function and/or may be electrically changeable to display multiple images, typically generated by a microprocessor control. In addition, activating the selector element may change or reconfigure the size of the image or text on the display element to suit the individual needs of the drivers, such as a senior driver.

In another aspect, the selector element comprises a touch sensitive element. For example, the touch sensitive element may be responsive to either heat, capacitance, inductance, or resistance.

In yet other aspects, the touch sensitive element preferably comprises a transparent touch sensitive element and includes one or more transparent conductive coatings, including a coating of indium tin oxide, tin oxide, doped tin oxide, or doped zinc oxide. In further aspects, the touch sensitive element comprises a plurality of coatings, such as a plurality of stacked coatings.

In another aspect, the interactive vehicular mirror system includes another display element, which is in association with and/or activatable by the selector element. The another display element is proximate to the touch sensitive element and displays an image indicating the function of the touch sensitive element when the touch sensitive element is actuated. For example, the image of the display element, which is in association with the selector element, may comprise an icon associated with the function of the selector element. In further aspects, the display element may comprise a liquid crystal display, a light emitting diode display (including an inorganic light emitting diode display and an organic light emitting diode display), a plasma display, a fluorescent display, such as a vacuum fluorescent display, and an electroluminscent display, for example.

In yet another form of the invention, an interactive vehicular mirror system includes an interior rearview mirror assembly, a plurality of display elements, and a respective plurality of user actuatable selector. The respective plurality of user actuatable selector elements are associated with the plurality of display elements and are provided at the interior rearview mirror assembly, with each of the selector elements having a function associated therewith. Each of the display elements displays an image indicating the function of a respective selector element at least when the respective selector element is actuated.

In another aspect, the system includes another display element, with at least one of the selector elements being associated with the another display element and actuating the display element to display at least one image associated with the function of the selector element when the selector element is actuated.

In one aspect, the another display element is positioned at the reflective element. For example, the display element may be positioned behind the reflective element and, further, is viewable through the reflective element at least when the display element is actuated.

In other aspects, the selector element is provided on an outer surface of the reflective element.

According to another aspect, the another display element displays at least one video image. For example, the display element may display a rearward field of view image, an internal cabin monitoring image, such as a baby minder image, a teleconferencing image, a forward facing image, a remote monitoring image, or a recorded image. Alternately or in addition, the second display element may display at least one of (i) a rain sensor operation display, (ii) a telephone information display, (iii) a highway status information display, (iv) a blind spot indicator display, (v) a hazard warning display, (vi) a vehicle status display, (vii) a page message display, (viii) a speedometer display, (ix) a tachometer display, (x) an audio system display, (xi) a fuel gauge display, (xii) a heater control display, (xiii) an air conditioning system display, (xiv) a status of inflation of tires display, (xv) a trailer tow image display, (xvi) an e-mail message display, (xvii) a compass display, (xviiii) an engine coolant temperature display, (xix) an oil pressure display, (xx) a cellular phone operation display, (xxi) a global positioning system display, (xxii) a weather information display, (xxiii) a temperature display, (xxiv) a traffic information display, (xxv) a telephone number display, (xxvi) a fuel status display, (xxvii) a battery condition display, (xxviii) a time display, (xxix) a train approach warning display, and (xxx) a toll transaction display.

In another form of the invention, an interactive vehicular mirror system includes an interior rearview mirror assembly, which includes a mirror casing and a reflective element, and a display element. The interior rearview mirror assembly is adapted to mount to an interior portion of the vehicle, with the reflective element having a rearward field of view when the interior rearview mirror assembly is mounted to the vehicle and, further, a plurality of user-actuatable selector elements. Each of the user-actuatable selector elements has at least one function associated therewith. Furthermore, at least one of the selector elements is associated with the display element and actuates the display element to display at least one image associated with the function of the selector element.

According to one aspect, the mirror system further includes an image capturing device, which is adapted for mounting to a vehicle. One of the selector elements comprises a rearvision selector element, with the image capturing device detecting an internal cabin image or an image rearward of the vehicle. The image capturing device sends an image signal based on the detected image to the display element for display by the display element when the rearvision selector element is actuated. For example, the interactive mirror system may include an exterior sideview mirror assembly, with the image capturing device positioned at the sideview mirror assembly for capturing an image rearward of the vehicle.

Accordingly, the interactive vehicular mirror system maximizes the driver's ability to engage in activities or be informed relative to some external or internal information while minimizing the distraction of the driver.

These and other objects, advantages, and features will become more apparent from a review of the description and drawings which follow.

DETAILED DESCRIPTION OF THE PREFERRED EMBODIMENTS

As shown in the FIGS. 1–4, a plurality of user interfaces for a plurality of functions are provided as touch sensitive locations provided on the front surface of the reflective element housed in the casing of an interior mirror assembly. Interior mirror assemblies suitable to use in this present invention typically comprise a reflective element housed in a casing, and with that casing pivotably attaching to a support that mounts to a vehicle windshield or header area, such as are disclosed in U.S. Pat. Nos. 5,820,097; 5,615,857; 5,330,149; 5,100,095; 4,930,742; 4,936,533; 5,487,522; 5,615,857; and 5,671,996; which are commonly assigned to Donnelly Corporation, and which are herein incorporated by reference in their entireties. In addition, the interior mirror assembly may include displays (such as described in U.S. patent application entitled REARVIEW MIRROR ASSEMBLY WITH ADDED FEATURE MODULAR DISPLAY, filed Nov. 24, 1999, by Timothy Skiver et al., now U.S. Pat. No. 6,329,925, the disclosure of which is incorporated by reference herein in its entirety) and lights (such as map lights, such as disclosed in such as disclosed in U.S. Pat. Nos. 5,938,321; 5,813,745; 5,820,245; 5,673,994; 5,649,756; or 5,178,448, the disclosures of which are herein incorporated by reference in their entireties).

Figure 5:
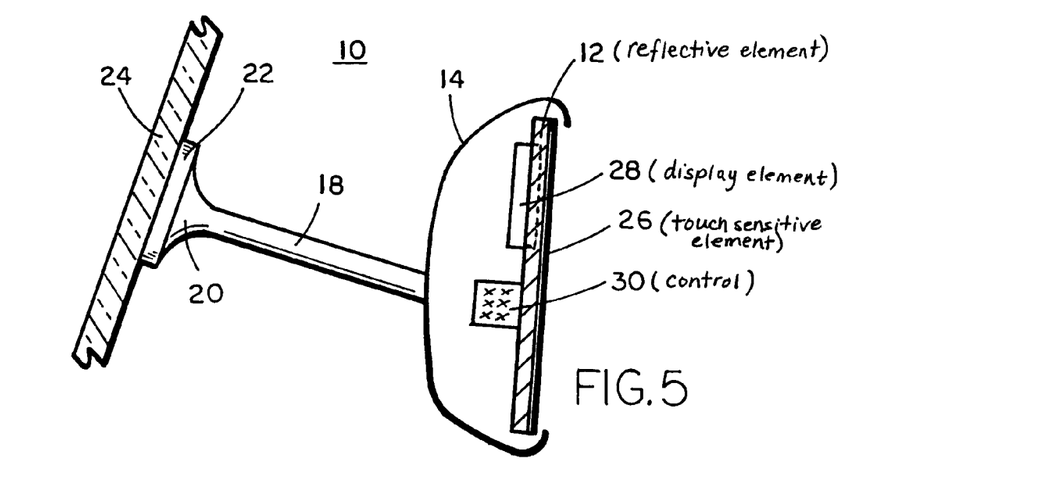
FIG. 5 is a side elevation schematic view of an interactive automotive rear vision system of the present invention.

A schematic of an interactive rearview mirror system 10 is shown in FIG. 5. Mirror system 10 includes an interior mirror assembly 11, which incorporates a reflective element 12. Reflective element 12 is housed in a casing 14, which is mounted to an interior portion of a vehicle, such as vehicle windshield 24, by a support arm 18. Optionally, casing 14 is pivotably mounted to support and 18, which attaches via a mount 20 to a mounting button 22 that is adhered to vehicle windshield 24 (note that alternately, mounting, of the assembly can be to the header region of the vehicle, as known in the mirror arts and/or can be a single pivot/ball joint or a two pivot/ball joint). Examples of suitable mounting arrangements can be found in U.S. Pat. Nos. 5,487,522; 5,671,996; 5,820,097; 5,615,857; 5,330,149; 5,100,095; 4,930,742; or 4,936,533 or U.S. patent application Ser. No. 08/781,408, filed Jan. 10, 1997, now U.S. Pat. No. 5,820,097, all commonly assigned to Donnelly Corporation, the disclosures of which are hereby incorporated herein by reference in their entireties.

The outermost or front surface of reflective element 12 comprises a selector element, such as a touch sensitive element 26. For suitable touch sensitive elements, reference is made to U.S. Pat. Nos. 6,001,486; and 6,087,012, the disclosures of which are herein incorporated by reference in their entireties, and U.S. patent applications entitled ENHANCED LIGHT TRANSMISSION CONDUCTIVE COATED TRANSPARENT SUBSTRATE, Ser. No. 60/213,663, filed Jun. 23, 2000; entitled PLASTIC SUBSTRATE FOR INFORMATION DEVICES, Ser. No. 60/231,096, filed Sep. 8, 2000; entitled REDUCED CONTRAST IMPROVED TRANSMISSION CONDUCTIVELY COATED TRANSPARENT SUBSTRATE, Ser. No. 60/239,788, filed Oct. 12, 2000; entitled SPACER ELEMENTS FOR INTERACTIVE INFORMATION DEVICES, Ser. No. 60/234,867, filed Sep. 22, 2000; entitled IMPROVED PLASTIC SUBSTRATE FOR INFORMATION DEVICES, Ser. No. 60/244,577, filed Oct. 31, 2000, which are all commonly assigned to Donnelly Corporation of Holland, Mich. and incorporated by reference in their entireties herein.

Optionally, a display element 28 (and most preferably a reconfigurable display element) is mounted at the rearmost or outermost surface of reflective element 12 so as to be at least partially (preferably substantially and most preferably fully) viewed through reflective element 12. However, other locations for display elements are possible, such as mounting to the side of, above, or below reflective element 12, such as is disclosed in U.S. patent application entitled INTERIOR REARVIEW MIRROR ASSEMBLY INCORPORATING A VIDEO SCREEN, filed Feb. 26, 2001, Ser. No. 09/793,002, now U.S. Pat. No. 6,690,268, the disclosure of which is incorporated by reference herein in its entirety.

For examples of locations of such displays and/or user interfaces and/or other accessories, including video screens, which are disclosed in U.S. patent application entitled INTERIOR REARVIEW MIRROR ASSEMBLY INCORPORATING A VIDEO SCREEN, filed Mar. 1, 2000, Ser. No. 60/186,520, microphones and/or speakers, which are disclosed in U.S. patent application Ser. No. 09/361,814, filed Jul. 27, 1999, now U.S. Pat. No. 6,201,642, and 09/199,907, filed Nov. 25, 1998, now U.S. Pat. No. 6,717,610, sound processing systems, including digital sound processing systems, which are disclosed in U.S. patent application entitled INTERIOR REARVIEW MIRROR SOUND PROCESSING SYSTEM, Ser. No. 09/466,010, filed Dec. 17, 1999, now U.S. Pat. No. 6,420,975, and in co-assigned U.S. patent application Ser. No. 09/396,179, filed Sep. 14, 1999, now U.S. Pat. No. 6,278,377, Ser. No. 09/382,720, filed Aug. 25, 1999, now U.S. Pat. No. 6,243,003, Ser. No. 09/449,121, filed Nov. 24, 1999, now U.S. Pat. No. 6,428,172, Ser. No. 09/433,467, filed Nov. 4, 1999,now U.S. Pat. No. 6,326,613, and Ser. No. 09/448,700, filed Nov. 24, 1999, now U.S. Pat. No. 6,329,925, displays, including tire pressure sensor system displays, compass sensors and displays, temperature displays, which are disclosed in U.S. patent application Ser. No. 09/244,726, filed Feb. 5, 1999, now U.S. Pat. No. 6,172,613, and in U.S. patent application entitled REARVIEW MIRROR ASSEMBLY WITH UTILITY FUNCTIONS, Ser. No. 09/449,121, filed Nov. 24, 1999, now U.S. Pat. No. 6,428,172, and U.S. Pat. No. 5,530,240, a communication module, which is disclosed in U.S. Pat. No. 5,798,688, blind spot detection systems, which are disclosed in U.S. Pat. Nos. 5,929,786 or 5,786,772, transmitters and/or receivers, including garage door openers and a digital network, which are described in U.S. Pat. No. 5,798,575, a memory mirror system, which is disclosed in U.S. Pat. Nos. 5,796,176, 5,798,575, 5,812,321, 5,786,772, and 5,959,367 and in U.S. patent applications entitled MEMORY MIRROR SYSTEM FOR VEHICLES, Ser. No. 09/448,690, filed Nov. 24, 1999, now U.S. Pat. No. 6,163,083, and A VEHICLE REARVIEW MIRROR AND A VEHICLE CONTROL SYSTEM INCORPORATING SUCH MIRROR, Ser. No. 09/341,450, filed Jul. 8, 1999, now U.S. Pat. No. 6,291,905; such as a hands-free phone attachment, a video device for internal cabin surveillance and/or video telephone function, which are disclosed in U.S. Pat. Nos. 5,760,962 and 5,877,897 and U.S. patent application Ser. No. 09/433,467, now U.S. Pat. No. 6,326,613 and U.S. patent application Ser. No. 08/918,772, entitled MODULAR REARVIEW MIRROR ASSEMBLY, filed Aug. 25, 1997, now U.S. Pat. No. 6,124,886, vehicle navigation systems, which are described in provisional application Ser. No. 60/131,593, filed Apr. 29, 1999, entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, map lights, including maps lights incorporating light emitting diodes (including organic light emitting diodes) generating a white light beam, which are disclosed in U.S. Pat. Nos. 5,938,321; 5,813,745; 5,820,245; 5,673,994; 5,649,756; 5,178,448; 5,669,698; 5,671,996; 4,733,336; and 4,646,210, microphones and/or speakers, which are disclosed in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610, a compass, which is disclosed in U.S. Pat. No. 5,924,212, GPS displays and systems, which are disclosed in U.S. Pat. No. 5,971,552 and U.S. patent applications entitled COMPLETE MIRROR-BASED GLOBAL-POSITIONING SYSTEM (GPS) NAVIGATION SOLUTION, filed Mar. 9, 2000, Ser. No. 60/187,960, and entitled VEHICLE-BASED NAVIGATION SYSTEM WITH SMART MAP FILTERING, HANDHELD UNIT HOME-BASE REGISTRATION AND MULTIPLE NAVIGATION SYSTEM PREFERENTIAL USE, Ser. No. 60/131,593, filed Apr. 29, 1999, cameras, including video cameras, which are disclosed in U.S. Pat. Nos. 5,877,897, 5,760,962, 5,959,367, 5,929,786, 5,949,331, 5,914,815, 5,786,772, 5,798,575, and 5,670,935, and U.S. patent applications entitled VEHICLE REAR VIEW MIRROR DISPLAY SYSTEM, Ser. No. 09/304,201, filed May 3, 1999, now U.S. Pat. No. 6,198,409, VEHICLE MIRROR DIGITAL NETWORK AND DYNAMICALLY INTERACTIVE MIRROR SYSTEM, Ser. No. 09/375,315, filed Aug. 16, 1999, now U.S. Pat. No. 6,175,164, WIDE ANGLE IMAGE CAPTURE SYSTEM FOR VEHICLES, Ser. No. 09/199,907; filed Nov. 25, 1998, now U.S. Pat. No. 6,717,610, WIDE ANGLE IMAGING SYSTEM, Ser. No. 09/361,814, filed Jul. 27, 1999, now U.S. Pat. No. 6,201,642 VEHICLE IMAGING SYSTEM WITH STEREO IMAGING, Ser. No. 09/372,915, filed Aug. 12, 1999, now U.S. Pat. No. 6,396,397; VEHICLE REARVIEW MIRROR DISPLAY SYSTEM, Ser. No. 09/300,201, filed May 3, 1999, REARVIEW VISION SYSTEM WITH INDICIA OF BACKUP TRAVEL, Ser. No. 09/313,139, filed May 17, 1999, now U.S. Pat. No. 6,222,447, and U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610, and U.S. patent application Ser. No. 09/422,467, filed Nov. 4, 1999, entitled VEHICLE INTERIOR MIRROR ASSEMBLY to Patrick Heslin and Niall R. Lynam, now U.S. Pat. No. 6,326,613, head lamp controllers, which are disclosed in pending U.S. patent application entitled VEHICLE HEADLIGHT CONTROL USING IMAGING SENSOR, Ser. No. 09/441,341, filed Nov. 16, 1999, telematic interfaces, which are disclosed in U.S. patent application Ser. No. 08/918,772, entitled MODULAR REARVIEW MIRROR ASSEMBLY, filed Aug. 25, 1997, now U.S. Pat. No. 6,124,886, storage and pendant accessories, which are disclosed in U.S. patent application entitled REARVIEW MIRROR ASSEMBLY WITH UTILITY FUNCTIONS, Ser. No. 09/449,121, filed Nov. 24, 1999, now U.S. Pat. No. 6,428,172, rain sensors, including non-contacting rain sensors, which are disclosed U.S. Pat. No. 4,973,844 entitled VEHICULAR MOISTURE SENSOR AND MOUNTING APPARATUS THEREFORE, and PCT International Application PCT/US94/05093 entitled MULTI-FUNCTION LIGHT SENSOR FOR VEHICLE, published as WO 94/27262 on Nov. 24, 1994, toll pay devices, including automatic toll pay devices or remote transaction systems, which are disclosed in U.S. Pat. No. 6,158,655 and application entitled A VEHICLE MOUNTED REMOTE TRANSACTION INTERFACE SYSTEM, filed Oct. 13, 2000 Ser. No. 09/687,778, now U.S. Pat. No. 6,547,133, trip computers, vehicle status displays, air bag activation status displays, instrumentation/console lighting, and other information display/user interface devices, which are disclosed U.S. patent application Ser. No. 09/244,726, filed Feb. 5, 1999, now U.S. Pat. No. 6,172,613, reference is made to the various patents, publications, and applications listed above, the entire disclosures of all the referenced applications, patents, and publications are incorporated by reverence herein in their entireties.

Figure 6:
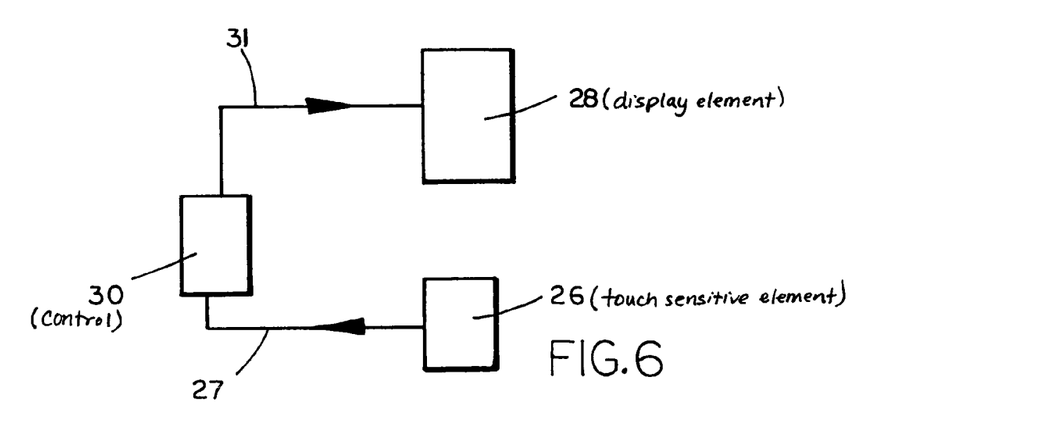
FIG. 6 is a similar view to FIGS. 1, 2, 3 and 4 illustrating a another selection of one of the selector elements.

Interactive mirror system 10 includes a control 30 that most preferably is located within casing 14. As shown schematically in FIG. 6, user interaction with touch sensitive element 26 (such as by touching or at least closely approaching with a human finger or, less preferably, by touching with a stylus or at least closely approaching with a stylus), preferably a transparent touch sensitive element, generates an output signal 27 indicative of user interaction that is input to control 30. In response, control 30 provides an output 31 to display element 28 to cause display element 28 to display the vehicle function or information desired by the driver. Display element 28 may perform a single display function or multiple display functions, such as providing indication of a vehicle function or functions, including a family of functions of a plurality of family of functions, for example a compass mirror display function, a temperature display function, a tire pressure/status display function, a status of inflation of tires display function, a GPS/navigation system function, a telematic function, computer display function, including e-mails and INTERNET access, a passenger air bag disabled display function, an automatic rain sensor operation display function, telephone dial information display function, highway status information display function, blind spot indicator display function, or the like.

Thus, and in accordance with present invention, a cognitive relationship is established between the touching of the touch sensitive element and generation of the display image on an adjacent or co-located display element, and most preferably, with the display element positioned behind at least a partially transparent touch sensitive element, such that activation of the touch sensitive element causes the display element to emit an image at least partially visible and preferably substantially visible through the transparent touch sensitive element.

Such displays may be an alpha-numeric display or a multi-pixel display, and may be fixed or scrolling. In addition, display element 28 may comprise an incandescent display, vacuum fluorescent display, electroluminscent display, light emitting diode display, cathode ray tube display, field emission display, E-ink display, or organic emitting polymer display or the like. Examples of display elements may be found in application entitled REARVIEW MIRROR ASSEMBLY INCORPORATING VEHICLE INFORMATION, Ser. No. 09/244,726, filed Feb. 5, 1999, by Jonathan DeLine and Niall R. Lynam, now U.S. Pat. No. 6,172,613, or U.S. Pat. No. 5,530,240, and U.S. patent application Ser. No. 09/433,467, filed Nov. 4, 1999, entitled VEHICLE INTERIOR MIRROR ASSEMBLY, to Patrick Heslin and Niall R. Lynam, now U.S. Pat. No. 6,326,613, commonly assigned to Donnelly Corporation, which are herein incorporated by reference in their entireties.

Figure 1:
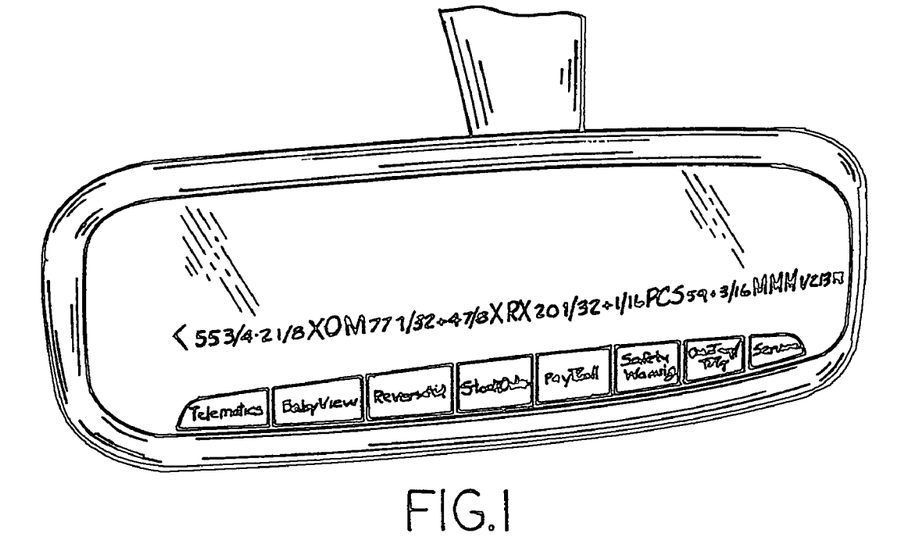
FIG. 1 is a front elevation view of an interactive automated rear vision system of the present invention which incorporates a display, which in the illustrated embodiment displays scrolling information.

Referring to FIG. 1, the reflective element 12 of interior rearview mirror assembly 11 shown includes a touch sensitive portion on its front surface formed by a plurality of touch sensitive elements 26. Each touch sensitive element 26 has a function associated with it. For example, touch sensitive elements 26 may have associated therewith functions relating to an activity, including internal and external activities, such as video conferencing, internal or external cabin surveillance, remote transactions, or the like, or internal or external information, such as vehicle status information, weather information, stock information, messaging, or the like. Thus, for example, the driver can reach up and touch one of the touch sensitive elements 26, which in the illustrated embodiment are identified as "TELEMATICS," "BABY VIEW," "REVERSE AID," "STOCK QUOTES," "PAY TOLL," "SAFETY WARNING," "COMP/TEMP DATA," "SERVICE" in order to activate and/or inquire of a particular function or item. As shown in FIG. 1, a stock quote is displayed on display 28 in response to the driver touching the "STOCK QUOTES" section or touch sensitive element of the mirror reflector element surface. When this particular area of the front of the reflective element is touched by a driver, an input is provided by touch sensitive element 26 to control 30 indicating that the driver desires a stock quote. Optionally, and desirably, control 30 can cause displays of other sections of the reflective element to reconfigure to show particular company stock identifiers (such as "DON" or "IBM" or the like), and thus inviting the driver to make a further touch selection of a particular company's stock. Once control 30 knows which stock is of interest, control 30 initiates a wireless connection to a remote telecommunication system such as ONSTAR™ available from General Motors Corporation, Detroit, Mich. or RESCU™ available from Ford Motor Company, Detroit, Mich. or makes a wireless connection to the INTERNET to access a stock quote site on the worldwide Web. Upon receiving back from the remote site the stock quote information, control 30 outputs this to display element 28 to display an image to the driver as illustrated in FIG. 1. As shown, display 28 may display the stock information in a scrolling display, such as a "ticker type" display, and most preferably a "display on demand" which is behind a substantially reflective portion and significantly light transmitting portion of the reflective element (and such as described in U.S. Pat. Nos. 5,668,663 and 5,724,187, which are herein incorporated by reference in their entireties). Using prompts displayed to the driver by display element 28, the driver can use touch sensitive element 26 or other touch activated devices to move between items or page between menu pages. Once the stock quoting activity is completed, the driver can page back to a standard menu of selection items, such as that shown in FIGS. 1–4.

Figure 2:
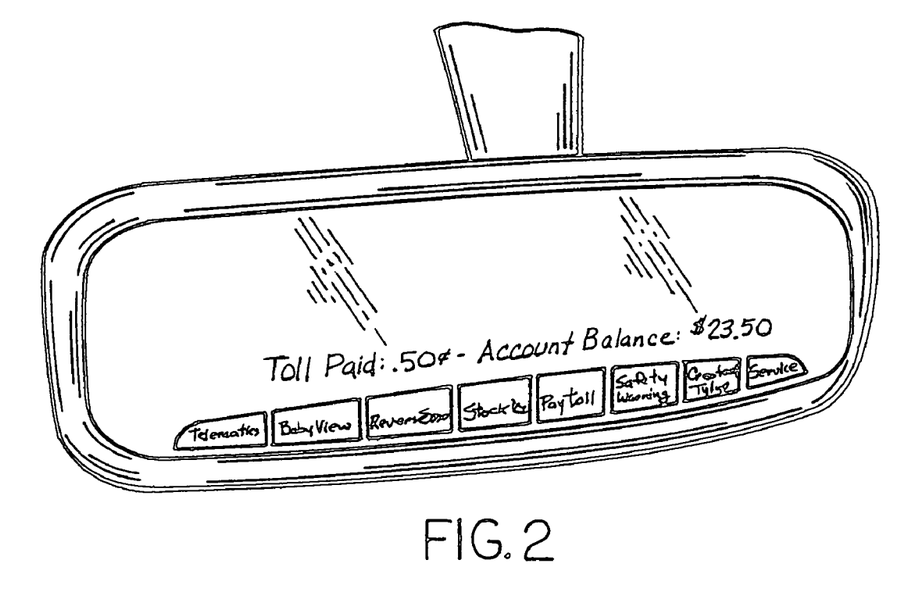
FIG. 2 is a similar view to FIG. 1 of the interactive automotive rear vision system illustrating the display displaying different information.

When driving to approach a toll station, the driver can select a "PAY TOLL" touch input section of the reflective element. This causes control 30 to initiate two-way wireless communication with a remote toll booth payment site, and the receipt for any toll paid along with any account balance remaining can be displayed such as illustrated in FIG. 2. For examples of suitable remote transaction systems, reference is made herein to U.S. Pat. No. 6,158,655, and application entitled A VEHICLE MOUNTED REMOTE TRANSACTION INTERFACE SYSTEM, filed Oct. 13, 2000 Ser. No. 09/687,778, now U.S. Pat. No. 6,547,133, which are incorporated by reference in their entireties.

Optionally, the vehicle is equipped with a camera, such as a baby minder camera, such as is described in co-assigned U.S. patent applications Ser. Nos. 09/466,010, filed Dec. 17, 1999, now U.S. Pat. Nos. 6,420,975; 09/396,179, filed Sep. 14, 1999, now U.S. Pat. Nos. 6,278,377; 09/382,720, filed Aug. 25, 1999, now U.S. Pat. Nos. 6,243,003; 09/449,121, filed Nov. 24, 1999, now U.S. Pat. Nos. 6,428,172; 09/433,467, filed Nov. 4, 1999, now U.S. Pat. No. 6,326,613; 09/448,700, filed Nov. 24, 1999, now U.S. Pat. No. 6,329,925, and application entitled INTERIOR REARVIEW MIRROR ASSEMBLY INCORPORATING A VIDEO SCREEN, Ser. No. 09/793,002, filed Feb. 26, 2001, now U.S. Pat. No. 6,690,268, the entire disclosures of all of which are hereby incorporated by reference herein. By touching the "BABY VIEW" portion of touch sensitive element 26, the view of a baby seated at a rear seat is displayed by display element 28 (FIG. 3).

Figure 3:
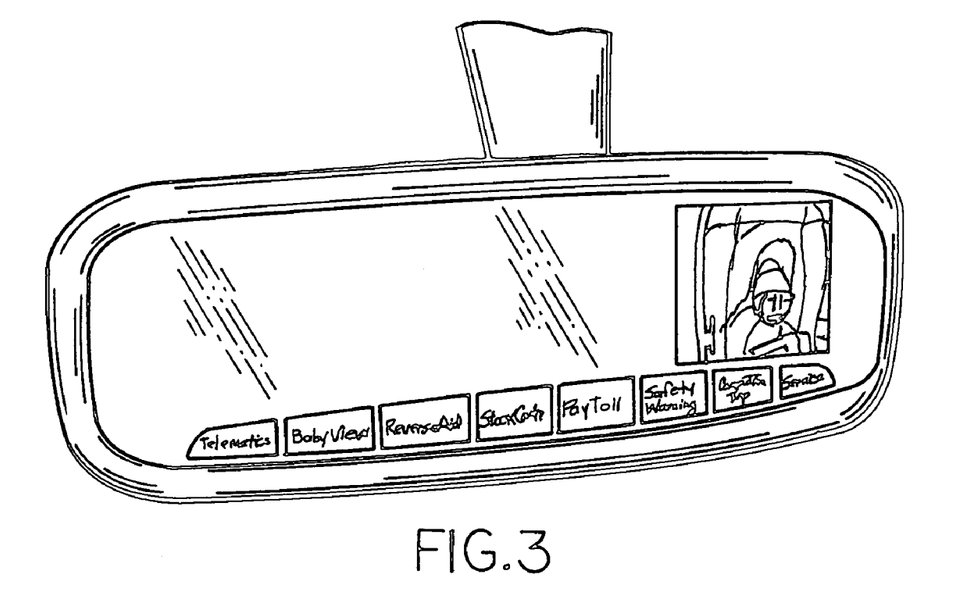
FIG. 3 is another embodiment of an interactive automotive rear vision system incorporating a video display, which in the illustrated embodiment illustrates a baby view images.
Figure 4:
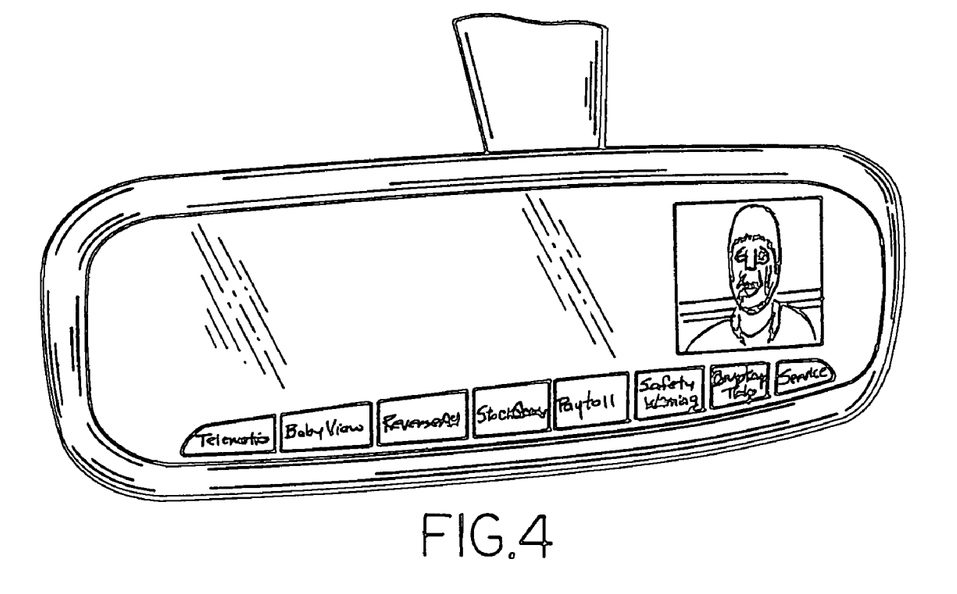
FIG. 4 is a similar view to FIG. 3 of the display displaying video images of a telematic system.

As shown in FIG. 3, selection of the "TELEMATICS" portion of touch sensitive element 26 causes control 30 to initiate a video phone link, with the image of the remote party being displayed at reflective element 12 by display element 28, such as described in U.S. Pat. Nos. 5,760,962 and 5,877,897, which are herein incorporated by reference in their entireties.

Figure 7:
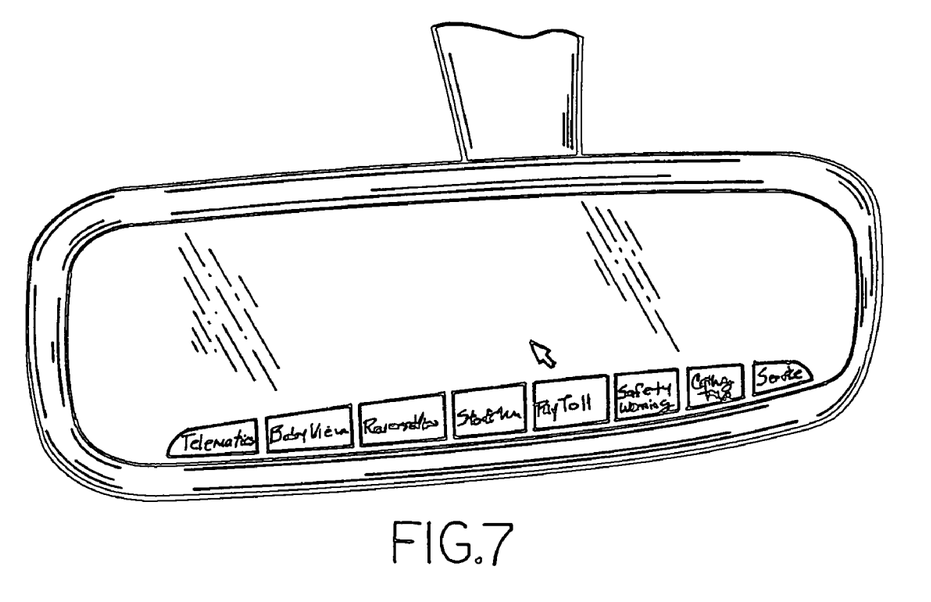
FIG. 7 is a similar view to FIGS. 3 and 4, with the video screen displaying reverse aid images.
Figure 8:
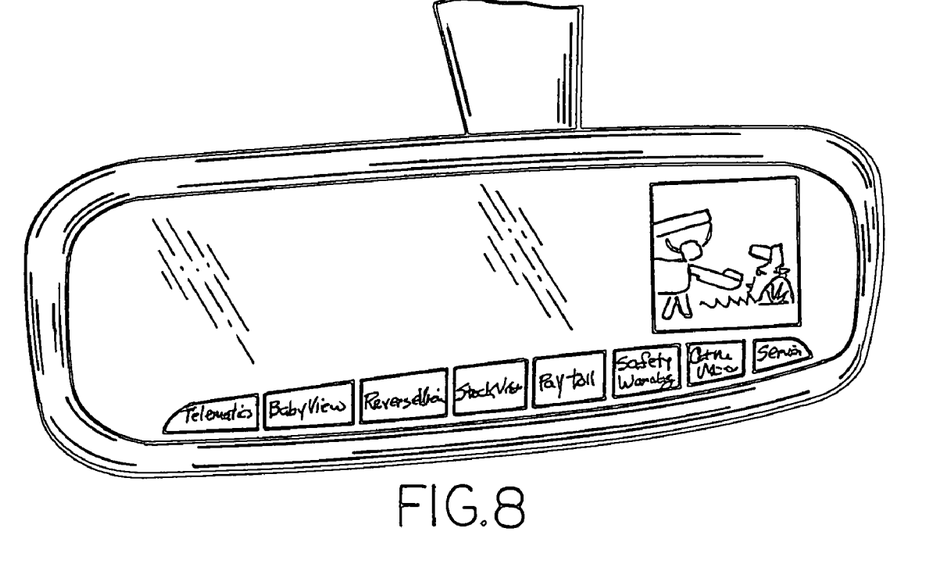
FIG. 8 is a schematic cross-sectional view of an interior rearview mirror assembly of the interactive automotive rear vision system of the present invention.

A safety warning or message (such as a tire pressure warning or a seat belt warning or an airbag deactivation warning or an engine or vehicle system malfunction warning or the like), can be provided at the touch sensitive surface 26 to alert the driver, as illustrated in FIG. 7. Optionally, the driver can touch the selector element at or adjacent to where the warning is displayed to bring up a menu of other choices/inputs in response to the cause of the warning. The vehicle can be provided with a rear facing camera for use when reversing (or a front facing camera for use in parking, rain sensing, or head lamp control or the like), such as is disclosed in U.S. Pat. Nos. 5,959,367; 5,929,786; 5,949,331; 5,914,815; 5,786,772; 5,798,575; 5,670,935; and U.S. patent applications entitled VEHICLE REARVIEW MIRROR DISPLAY SYSTEM, Ser. No. 09/304,201, filed May 3, 1999, now U.S. Pat. No. 6,198,409; entitled VEHICLE MIRROR DIGITAL NETWORK AND DYNAMICALLY INTERACTIVE MIRROR SYSTEM, Ser. No. 09/375,315, filed Aug. 16, 1999, now U.S. Pat. No. 6,175,164; entitled WIDE ANGLE IMAGE CAPTURE SYSTEM FOR VEHICLES, Ser. No. 09/199,907, filed Nov. 25, 1998, now U.S. Pat. No. 6,717,610; entitled WIDE ANGLE IMAGING SYSTEM, Ser. No. 09/361,814, filed Jul. 27, 1999, now U.S. Pat. No. 6,201,642; entitled VEHICLE IMAGING SYSTEM WITH STEREO IMAGING, Ser. No. 09/372,915, filed Aug. 12, 1999, now U.S. Pat. No. 6,396,397; entitled VEHICLE REARVIEW MIRROR DISPLAY SYSTEM, Ser. No. 09/300,201, filed May 3, 1999; and entitled REARVIEW VISION SYSTEM WITH INDICIA OF BACKUP TRAVEL, Ser. No. 09/313,139, filed May 17, 1999, now U.S. Pat. No. 6,222,447, which are all commonly assigned to Donnelly Corporation of Holland, Mich., the disclosures of which are herein incorporated by reference in their entireties. By the driver touching reflective element 12 at the portion of touch sensitive element 26 indicating "REVERSE AID," an image immediately to the rear of the vehicle, as illustrated in FIG. 8, is displayed by display element 28.

Touch sensitive element 26 can be a capacitive type or a resistive type or an inductive type, such as are known in the touch panel arts, including such as disclosed in U.S. Pat.

Nos. 3,798,370; 4,198,539; 4,661,655; 4,731,508; 4,822,957; and 5,045,644, and U.S. Pat. Nos. 6,001,486; and 6,087,012, the disclosures of which are herein incorporated by reference in their entireties, and U.S. patent applications entitled ENHANCED LIGHT TRANSMISSION CONDUCTIVE COATED TRANSPARENT SUBSTRATE, Ser. No. 60/213,663, filed Jun. 23, 2000; entitled PLASTIC SUBSTRATE FOR INFORMATION DEVICES, Ser. No. 60/231,096, filed Sep. 8, 2000; entitled REDUCED CONTRAST IMPROVED TRANSMISSION CONDUCTIVELY COATED TRANSPARENT SUBSTRATE, Ser. No. 60/239,788, filed Oct. 12, 2000; entitled SPACER ELEMENTS FOR INTERACTIVE INFORMATION DEVICES, Ser. No. 60/234,867, filed Sep. 22, 2000; entitled IMPROVED PLASTIC SUBSTRATE FOR INFORMATION DEVICES, Ser. No. 60/244,577, filed Oct. 31, 2000, which are incorporated by reference herein in their entireties. Also, the touch inputs of this present invention do not necessarily require physical contact between the driver's finger and touch sensitive element 26. Close approach of the driver's finger (or a stylus) to the touch sensitive surface may suffice to achieve a touch input. This can thus be by non-contacting input or by contacting input by a variety of means such as thermal or pyro detection, capacitive or inductive detection, resistive sensing, electromagnetic disturbance sensing or the like. Optionally, a reading of the fingerprint of the person touching the mirror reflector can be taken to verify identity of the person and so authorize particular actions in response (such as turning on the vehicle ignition, such as to star the engine, conducting a remote banking transaction, identifying a person for the purpose of setting vehicle accessories such as seat position, mirror position, climate control, audio system controls, ride system, and the like to the particular setting preferred by that individual person such as is common in vehicle memory systems).

Touch sensitive element 26 can comprise a transparent conductive coating or stack of coatings, such as of indium tin oxide, tin oxide, doped tin oxide, doped zinc oxide, or any other transparent conductor coating or stack known in the touch screen arts, and can be part of a 4-wire system or a 5-wire system as such are known in the touch screen art, or can be a capacitive-type touch screen.

Preferably, touch screen element 26 and display element 28 are re-configurable so that each can be associated with more than one function. Dependent on the particular circumstance, an in-vehicle microprocessor can create on touch screen element 26 and display element 28 whatever icon, highlight or display is desired presented to the driver. In addition, one of the touch screen elements (26) may be used to toggle between the various available functions for a given touch screen element 26.

Note that the display that the driver touches via touch screen element 26 can be generated by display element 28 itself or alternately, by a separate display located behind the mirror reflector. In such a configuration where a display element is behind the mirror reflector, the reflective mirror coating of the mirror reflective element can be locally at least partially removed at the location of the display element disposed behind the mirror element. Optionally, where all the reflective mirror coating is removed, a semitransparent but significantly reflecting coating or series of coatings (such as a thin metal film coating or a multilayer of coatings, including a thin metal coating of silver, aluminum, rhodium, (or their alloys), or the like, or a dichroic coating or coating stack, can be used that substantially masks the display element from driver notice until the display element is powered to display information, such as disclosed in U.S. Pat. Nos. 5,668,663 and 5,724,187, which are incorporated by reference in their entireties. Such has been described as "display on demand" in the art. Such display can include a "display on demand" such as disclosed in U.S. Pat. Nos. 5,668,663 and 5,724,187 noted above. In this regard, it is preferable that the display be a light emitting display, such as a fluorescent display, a vacuum fluorescent display, a field emission display, an electroluminscent display, a fluorescent display, a plasma display, or a light emitting diode display, such as an organic or inorganic light emitting diode display. Alternatively, the reflective element may comprise a substantially reflecting, significantly light transmitting reflective element, such as disclosed in U.S. Pat. Nos. 5,668,663 and 5,724,187 noted above. An example, such as a semi-transparent reflector would be a third surface reflector coated on the third surface of an electrochromic mirror element, as known in the electrochromic mirror art, consisting of a thin metal coating (such as of silver, silver alloy, aluminum, aluminum alloy) that is significantly reflecting but also significantly transmitting and that, preferably, is overcoated with a transparent conductor such as indium tin oxide when contacting an electrochromic medium (preferably an electrochromic solid polymer film) when serving as a combined third surface reflector/conductor layer in an electrochromic laminate cell construction. For further details of suitable reflective elements with portions of the reflective mirror coating adapted to permit light to transmit through the reflective element or of a highly reflecting/significantly transflective reflective element, reference is made to U.S. Pat. Nos. 5,668,663 and 5,724,187.

Figure 9:
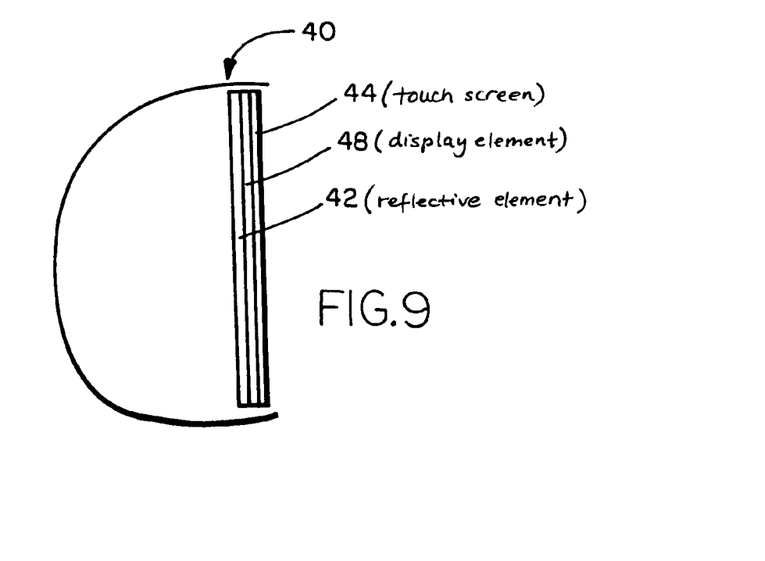
FIG. 9 is a side elevation schematic view of an interactive mirror reflective element of the present invention.

A preferred construction for the interactive mirror reflective element of the present invention is shown in FIG. 9. Interactive mirror assembly 40 comprises a touch screen 44 upon which, on its outermost surface, is comprised a touch sensitive element, such as a touch sensitive element comprising a transparent electronic conducting coating of indium tin oxide. Behind touch screen 44 is disposed reflective element 42. Between the touch screen 44 and the reflective element 42 is disposed display element 48. Display element 48 is preferably a liquid crystal, an electrochromic, a plasma, or an electroluminscent element that has high transparency in one state and that either emits light or absorbs light it a second state. Individual pixels of display element 48 are, preferably, addressable so that display element 48 is reconfigurable. When in its high transparency state, display element 48 allows light incident thereon from touch screen 44 pass through and reflect off the mirror reflective coating of reflective element 42 (which may be a silvered prism element or may be an electrochromic element). When particular pixels of display element 48 are activated, the display formed thereby is visible in front of reflective element 12.

Co-location of the touch sensitive element (in a superimposed relationship or in a proximate relationship) and the display element it controls in accordance with the present invention has several advantages. For example, and as noted above there is a cognitive relationship established between the touching of the touch sensitive element and the generation of the display image. With the display element positioned behind at least a partially transparent touch sensitive element, such that activation of the touch sensitive element causes the display element to emit an image at least partially visible and preferably at least substantially visible through the transparent touch sensitive element, there is a cognitive asscociation between the touch sensitive element and the display, thus reducing the amount of distraction to the driver.

Also, the driver can repetitively touch a particular touch sensitive element and scroll down through a menu of options seen to be displayed by the particular display element associated with that particular touch sensitive element. Upon reaching a menu item desired selected, that menu item may be selected by the driver (such as by touching "OK" on a separate touch sensitive element). After using the interactive system for a while, a driver can select a selector element without looking directly at the mirror, with the image generated by the display element being only detected in the peripheral vision of the driver. Furthermore, by co-locating the display element behind the touch sensitive element, the viewing area of the reflective element is maximized.

As an alternate and/or an addition to providing a touch sensitive surface/element accessible by touching the mirror reflective element, a touch sensitive surface/element can optionally be provided in the bezel of the casing of the interior mirror assembly, such as in a chin portion below the reflective element of the assembly or in an eyebrow region above the reflective element or at a mirror mount or support region or an accessory module or pod attached or adhered or adjacent to the interior mirror assembly.

The rearview mirror assemblies of the present invention can incorporate a wide variety of electrical and electronic devices incorporated therein and further utility functions, such as described in U.S. patent application entitled REARVIEW MIRROR ASSEMBLY WITH UTILITY FUNCTIONS, filed Nov. 24, 1999, by Barry W. Hutzel, Niall R. Lyman, and Darryl P. DeWind, now U.S. Pat. No. 6,428,172, and added display features as described in U.S. patent application entitled REARVIEW MIRROR ASSEMBLY WITH ADDED FEATURE MODULAR DISPLAY, filed Nov. 24, 1999, by Timothy Skiver at al., now U.S. Pat. No. 6,329,925, which are herein incorporated by reference herein in their entireties. For example, the rearview mirror assemblies of the present invention may include: antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. application Ser. No. 09/244,726, filed Feb. 5, 1999, now U.S. Pat. No. 6,172,613; blind spot detection systems, such as disclosed in U.S. Pat. Nos. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433,467, now U.S. Pat. No. 6,326,613; a remote keyless entry receiver; map lights, such as disclosed in U.S. Pat. Nos. 5,938,321; 5,813,745; 5,820,245; 5,673,994; 5,649,756; or 5,178,448, including a non-incandescent light, such as an LED source unit, preferably a white light emitting LED, including a non-incandescent light source unit, such as described in U.S. provisional application entitled "VEHICULAR NON-INCANDESCENT LIGHT SOURCE UNIT", Ser. No. 60/271,466, filed by John O. Lindahl and Niall R. Lynam on Feb. 26, 2001; microphones and/or speakers, such as disclosed in U.S. patent applications Ser. No. 09/361,814, filed Jul. 27, 1999, now U.S. Pat. No. 6,201,642, and 09/199,907, filed Nov. 25, 1998, now U.S. Pat. No. 6,717,610; a compass, such as disclosed in U.S. Pat. No. 5,924,212; seat occupancy detector; a trip computer; an ON STAR System or the like, with all of the referenced patents and applications being commonly assigned to Donnelly Corporation, the disclosures of which are herein incorporated by reference in their entireties.

In addition, the touch system of the present invention may encompass a global positioning system (GPS), such as described in U.S. application entitled COMPLETE MIRROR-BASED GLOBAL POSITIONING SYSTEM (GPS) NAVIGATION SOLUTION, filed by Kevin C. McCarthy, Eugene V. Uhlmann, and Niall R. Lynam, on Mar. 5, 2001, now U.S. Pat. No. 6,477,464, the entire disclosure of which is incorporated by reference in its entirety.

Mirror system 10 may include circuitry for mirror mounted video cameras, which are used to visually detect the presence moisture on the windshield and actuate windshield wipers accordingly, and/or actuate or control vehicle headlights, such as described in U.S. patent application Ser. No. 08/621,863, filed Mar. 25, 1996, entitled VEHICLE HEADLIGHT CONTROL USING IMAGING SENSOR, by Schofield et al., now U.S. Pat. No. 6,097,023, U.S. patent application Ser. No. 09/599,979, filed Jun. 22, 2000, now U.S. Pat. No. 6,320,176, or U.S. patent application Ser. No. 09/441,341, filed Nov. 16, 1999, or mirror mounted cameras for vehicle internal cabin monitoring disclosed in U.S. Pat. No. 5,877,897; 5,550,677; and 5,760,962, both commonly assigned to Donnelly Corporation, which are hereby incorporated herein by reference in their entireties, or mirror mounted cameras for rear vision systems as disclosed in U.S. Pat. Nos. 5,959,367; 5,929,786; 5,949,331; 5,914,815; 5,786,772; 5,798,575; 5,670,935; and U.S. patent applications entitled VEHICLE MIRROR DIGITAL NETWORK AND DYNAMICALLY INTERACTIVE MIRROR SYSTEM, Ser. No. 09/375,315, filed Aug. 16, 1999, now U.S. Pat. No. 6,175,164; entitled VEHICLE WITH REARVIEW MIRROR DISPLAY SYSTEM, Ser. No. 09/304,201, filed May 3, 1999, now U.S. Pat. No. 6,198,409; entitled REARVIEW VISION SYSTEM WITH INDICIA OF BACKUP TRAVEL, Ser. No. 09/313,139, filed May 17, 1999, now U.S. Pat. No. 6,222,447; entitled VEHICLE CAMERA DISPLAY, filed Feb. 5, 2001, by Kenneth Schofield et al. now U.S. Pat. No. 6,611,202; entitled VEHICLE REARVIEW MIRROR DISPLAY SYSTEM, Ser. No. 09/304,201, filed May 3, 1999, now U.S. Pat. No. 6,198,409; entitled VEHICLE MIRROR DIGITAL NETWORK AND DYNAMICALLY INTERACTIVE MIRROR SYSTEM, Ser. No. 09/375,315, filed Aug. 16, 1999, now U.S. Pat. No. 6,175,164; entitled WIDE ANGLE IMAGE CAPTURE SYSTEM FOR VEHICLES, Ser. No. 09/199,907, filed Nov. 25, 1998, now U.S. Pat. No. 6,717,610; entitled WIDE ANGLE IMAGING SYSTEM, Ser. No. 09/361,814, filed Jul. 27, 1999, now U.S. Pat. No. 6,201,642; entitled VEHICLE IMAGING SYSTEM WITH STEREO IMAGING, Ser. No. 09/372,915, filed Aug. 12, 1999, now U.S. Pat. No. 6,396,397; entitled VEHICLE REARVIEW MIRROR DISPLAY SYSTEM, Ser. No. 09/300,201, filed May 3, 1999; and entitled REARVIEW VISION SYSTEM WITH INDICIA OF BACKUP TRAVEL, Ser. No. 09/313,139, filed May 17, 1999, now U.S. Pat. No. 6,222,447, which are all commonly assigned to Donnelly Corporation of Holland, Mich., the disclosures of which are herein incorporated by reference in their entireties. Examples of a tire pressure display or monitoring system is described in U.S. patent application entitled TIRE INFLATION ASSISTANCE MONITORING SYSTEM, Ser. No. 09/513,941, filed Feb. 28, 2000, now U.S. Pat. No. 6,294,989, and TIRE INFLATION ASSISTANCE MONITORING SYSTEM, filed Nov. 10, 2000, now U.S. Pat. No. 6,445,287, which are herein incorporated by reference in their entireties.

In addition, lighting provided in any of the rearview mirror assemblies may incorporate a non-incandescent light source unit, such as described in U.S. provisional application entitled VEHICULAR NON-INCANDESCENT LIGHT SOURCE UNIT, Ser. No. 60/271,466, by John O. Lindahl and Niall R. Lynam, filed Feb. 26, 2001, the entire disclosure of which is incorporated by reference herein.

Other features which can be incorporated include: a baby minder system, such as the vehicle interior monitoring system described in U.S. Pat. Nos. 5,877,897 and 5,760,962 or the rear vision system described in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610, and U.S. patent application Ser. No. 09/422,467, filed Nov. 4, 1999, entitled VEHICLE INTERIOR MIRROR ASSEMBLY, to Patrick Heslin and Niall R. Lynam, now U.S. Pat. No. 6,326,613, all of which are incorporated by reference in their entireties herein.

In addition, all of the above interactive automotive rear vision systems may be part of a video display assembly, such as disclosed in application entitled INTERIOR REARVIEW MIRROR ASSEMBLY INCORPORATING A VIDEO SCREEN, filed Feb. 26, 2001, Ser. No. 09/793,002, now U.S. Pat. No. 6,690,268, the disclosure of which is incorporated by reference herein in its entirety.

Therefore, it can be appreciated that an interactive mirror system is provided that enables a driver to interact with multiple systems or devices and also provides the driver with a multitude of information, with these various features centrally located at the interior rearview mirror assembly.

We claim:

1. An interactive vehicular mirror system comprising:
an interior rearview mirror assembly having a mirror casing and a reflective element, said mirror casing including a bezel portion, said mirror assembly being adapted to mount at an interior portion of the vehicle, and said reflective element having a rearward field of view when said interior mirror assembly is mounted in a vehicle;
a plurality of user actuatable selector elements, said plurality of user actuatable selector elements comprising touch sensitive elements;
said user actuatable selector elements being provided at said bezel portion at a plurality of bezel locations;
said touch sensitive elements of said user actuatable selector elements being responsive to a change in at least one of heat, electrical capacitance, electrical inductance or electrical resistance due to at least close approachment of a human finger;
a plurality of display elements at said interior rearview mirror assembly at a plurality of display locations;
a display element of said plurality of display elements being associated with a respective one of said touch sensitive elements at said bezel portion, said display element being selectively activated by activation of said respective touch sensitive element;
wherein display information desired by a user is generated in response to said touch sensitive elements being actuated by the user and is displayed above said display elements;
said display location of said display element and said bezel location of said respective touch sensitive element being one of local one another and co-located such that a cognitive relationship between said display element and said respective touch sensitive element is established.

2. The interactive vehicular mirror system according to claim 1, wherein said reflective element comprises a prismatic reflective element.

3. the interactive vehicular mirror system according to claim 1, wherein said reflective element comprises an electrochromic reflective element.

4. The interactive vehicular mirror system according to claim 1, wherein at least one of said display elements comprises a re-configurable display element and whereby said re-configurable display element may be associated with more than one function.

5. The interactive vehicular mirror system according to claim 1, wherein at least one of said display elements displays an icon when actuated.

6. The interactive vehicular mirror system according to claim 1, wherein at least one of said display elements comprises one chosen from a liquid crystal display, an organic light emitting diode display, an inorganic light emitting diode display, a plasma display, a fluorescent display, and an electroluminescent display.

7. The interactive vehicular mirror system according to claim 1, wherein said reflective element includes a semitransparent reflector, and wherein at least one of said plurality of display elements is positioned behind said semitransparent reflector.

8. The interactive vehicular mirror system according to claim 7, wherein said semitransparent reflector comprises one of a metal coating and a transparent conductor.

9. The interactive vehicular mirror system according to claim 1, wherein at least one of said display elements comprises a light emitting display.

10. The interactive vehicular mirror system according to claim 9, wherein said light emitting display comprises one chosen from a liquid crystal display, an electrochromic display, an organic light emitting diode display, an inorganic light emitting diode display, a plasma display, a fluorescent display, and an electroluminescent display.

11. The interactive vehicular mirror system according to claim 9, wherein at least one of said display elements is disposed behind said reflective element.

12. The interactive vehicular mirror system according to claim 9, wherein said reflective element includes a reflector, a portion of said reflector being at least partially removed to form a window, at least one of said display elements being disposed behind said window and viewable through said window when said at least one of said display elements is activated.

13. The interactive vehicular mirror system according to claim 9, wherein said reflective element comprises a semitransparent reflective element, said generated display information being viewable through said semitransparent reflective element when said display information is generated.

14. The interactive vehicular mirror system according to claim 1, wherein at least one of said user actuatable selector elements comprises a back-lit touch sensitive element.

15. The interactive vehicular mirror system according to claim 1, wherein at least one of said display information comprises an alpha-numeric image display.

16. The interactive vehicular mirror system according to claim 1, wherein at least one of said display information comprises a multi-pixel display.

17. The interactive vehicular mirror system according to claim 1, wherein at least one of said display elements displays a family of display functions.

18. The interactive vehicular mirror system according to claim 17, wherein said family of display functions includes at least one chosen from (i) a compass mirror display function, (ii) a temperature display function, (iii) a tire pressure/status display function, (iv) a status of inflation of tires display function, (v) a GPS/navigation system function, (vi) a telematic function, (vii) computer display function, (viii) e-mail function, (ix) an INTERNET access function, (x) a passenger air bag disabled display function, (xi) an automatic rain sensor operation display function, (xii) telephonic dial information display function, (xiii) highway status information display function, and (xiv) blind spot indicator display function.

19. The interactive vehicular mirror system according to claim 1, wherein at least one of said display information comprises a fixed display.

20. The interactive vehicular mirror system according to claim 1, wherein at least one of said display information comprises a scrolling display.

21. The interactive vehicular mirror system according to claim 1, wherein at least one of said display information comprises a video display image.

22. An interactive vehicular mirror system comprising:
an interior rearview mirror assembly having a mirror casing and a reflective element, said mirror casing having a bezel portion, said mirror assembly being adapted to mount at an interior portion of the vehicle, and said reflective element having a rearward field of view when said interior mirror assembly is mounted in a vehicle;
a first display element at said reflective element at a first display location;
a second display element at a second display location;
a first user actuatable selector element comprising a first touch sensitive element, said first user actuatable selector element being provided at said bezel portion of said mirror casing at a first bezel location;
a second user actuatable selector element comprising a second touch sensitive element, said second user actuatable selector element being provided at said bezel portion of said mirror casing at a second bezel location;
said first and second touch sensitive elements of said first and second user actuatable selector elements being responsive to a change in at least one of heat, electrical capacitance, electrical inductance or electrical resistance due to at least close approachment of a human finger;
a first display information being generated in response to said first touch sensitive element of said first user actuatable selector element being actuated by a user and being displayed above said first display element;
a second display information being generated in response to said second touch sensitive element of said second user actuatable selector element being actuated by a user and being displayed above said second display element;
said first display element and said first bezel location of said first user actuatable selector element being one of local one another and co-located such that a cognitive relationship between said first display element and said first user actuatable selector element is established; and
said second display element and said second bezel location of said second user actuatable selector element being one of local one another and co-located such that a cognitive relationship between said second display element and said second user actuatable selector element is established.

23. The interactive vehicular mirror system according to claim 22, wherein said second display element is positioned at said reflective element.

24. The interactive vehicular mirror system according to claim 23, wherein said second display element is positioned behind said reflective element and is viewable through said reflective element when said second display element is activated.

25. The interactive vehicular mirror system according to claim 22, wherein said first display element is proximate said first touch sensitive element.

26. The interactive vehicular mirror system according to claim 22, wherein each of said first and second display elements comprises one chosen from a liquid crystal display, an organic light emitting diode display, an inorganic light emitting diode display, an electrochromic display, a plasma display, a fluorescent display, and an electroluminescent display.

27. The interactive vehicular mirror system according to claim 22, wherein at least one of said first display information and said second display information is dissolved as at least one video image.

28. The interactive vehicular mirror system according to claim 27, wherein said video image comprises one chosen from (i) a rearward field of view image, (ii) an internal cabin monitoring image, (iii) a teleconferencing image, (iv) a remote monitoring image, (v) an emergency recording image, and (vi) a forward field of view image.

29. The interactive vehicular mirror system according to claim 22, wherein at least one of said first display information and said second display information comprises at least one chosen from (i) a rain sensor operation display, (ii) a telephone information display, (iii) a highway status information display, (iv) a blind spot indicator display, (v) a hazard warning display, (vi) a vehicle status display, (vii) a page message display, (viii) a speedometer display, (ix) a tachometer display, (x) an audio system display, (xi) a fuel gauge display, (xii) a heater control display, (xiii) an air conditioning system display, (xiv) a status of inflation of tires display, (xv) a wailer tow image display, (xvi) an e-mail message display, (xvii) a compass display, (xviii) an engine coolant temperature display, (xix) an oil pressure display, (xx) a cellular phone operation display, (xxi) a global positioning system display, (xxii) a weather information display, (xxiii) a temperature display, (xxiv) a traffic information display, (xxv) a telephone number display, (xxvi) a fuel status display, (xxvii) a battery condition display, (xxviii) a time display, (xxix) a train approach warning display, and (xxx) a toll transaction display.

30. The interactive vehicular mirror system according to claim 22, wherein at least one of said first display information and said second display information is adapted to display scrolling display information.

31. The interactive vehicular mirror system according to claim 22, wherein at least one of said first display information and said second display elements information displays at least two displays.

32. The interactive vehicular mirror system according to claim 22, wherein said reflective element comprises a prismatic reflective element.

33. The interactive vehicular mirror system according to claim 32, wherein said reflective element includes a reflector on a back surface of said reflective element, said reflector being at least partially removed to define a window, and said second display being positioned at least partially behind said window.

34. The interactive vehicular mirror system according to claim 22, wherein said reflective element comprises an electrochromic reflective element.

35. The interactive vehicular mirror system according to claim 34, wherein said reflective element includes an electrochromic medium and a reflector, a portion of said reflector being at least partially removed, and said second display information being viewable through said reflective element.

36. An interactive vehicular mirror system comprising:
an interior mirror assembly having a mirror casing and a reflective element, said mirror casing including a bezel portion, said interior mirror assembly being adapted to mount at an interior portion of a vehicle, said reflective element having a rearward field of view when said interior rearview mirror assembly is mounted to the vehicle;

first and second user actuatable selector elements, said first user actuatable selector element comprising a first touch sensitive element, said second user actuatable selector element comprising a second touch sensitive element said first user actuatable selector element being located at said bezel portion of said mirror casing at a first bezel location, and said second user actuatable selector element being located at said bezel portion of said mirror casing at a second bezel location;

said first user actuatable selector element activating a display element to display a first display information associated with said first user actuatable selector element;

said first display information being generated in response to actuation of said first user actuatable selector element and being displayed above said display element;

said second user actuatable selector element activating another display element to display a second display information associated with said second user actuatable selector element;

said second display information being generated in response to said second actuation of a user actuatable selector element and being displayed above said other display element;

each of said first and second touch sensitive elements of said first and second user actuatable selector elements being individually responsive to a change in at least one of heat, electrical capacitance, electrical inductance, or electrical resistance due to at least close approachment of a human finger;

said first bezel location of said first user actuatable selector element being one of local and co-located with a first display location of said first display information such that a cognitive relationship between said first user actuatable selector element and said first display information is established; and said second bezel location of said second user actuatable selector element being one of local and en-located with a second display location of said second display information such that a cognitive relationship between said second user actuatable selector element and said second display information is established.

37. The interactive vehicular mirror system according to claim 36, wherein at least one of said first display information and said second display information is selected from the group consisting of (i) a telephone conference display (ii) a highway status information display, (iii) a blind spot information display, (iv) a hazard warning information display, (v) a vehicle status information display, (vi) a page messaging information display, (vii) a speedometer information display, (viii) a tachometer information display. (ix) a remote transaction information display, (x) an audio system information display, (xi) a fuel gauge information display, (xii) a heater control information display, (xiii) a ventilation system information display, (xiv) a status of inflation of tires information display, (xv) a trailer tow display, (xvi) an e-mail message information display, (xvii) a compass information display, (xviii) an engine coolant temperature information display, (xix) an oil pressure information display, (xx) a cellular phone operation information display, (xxi) a global positioning system information display, (xxii) a weather information display, (xxiii) a temperature information display, (xxiv) a traffic information display, (xxv) a telephone number information display, (xxvi) fuel status information display. (xxvii) battery condition information display, (xxviii) time information display, and (xxix) stock information display.

38. The interactive vehicular mirror system according to claim 36, wherein at least one of said first display information and said second display information displays at least one chosen from (i) a rearward field of view display, (ii) an internal cabin monitoring display, (iii) a teleconferencing display, (iv) a remote monitoring display, (v) an emergency recording display, and (vi) a forward field of view display.

39. The interactive vehicular mirror system according to claim 36, further comprising an image capturing device adapted for mounting to the vehicle, one of said first and second user actuatable selector elements including a rear vision selector element, said image capturing device detecting at least one chosen from an internal cabin image and an image rearward of the vehicle and sending an image signal based on said at least one chosen from an internal cabin image and an image rearward of the vehicle for display of said at least one chosen from an internal cabin image and an image rearward of the vehicle by at least one of said first display information and said second display information when said rear vision selector element is actuated.

40. The interactive vehicular mirror system according to claim 39, further comprising an exterior sideview mirror assembly, said image capturing device being positioned at said exterior sideview mirror assembly for capturing an image rearward of the vehicle.

41. The interactive vehicular mirror system according to claim 36, wherein said interior rearview mirror assembly further includes at least one accessory selected from the group consisting of (i) a trainable garage door opener, (ii) a universal home access system, (iii) an INTERNET interface, (iv) a remote keyless entry receiver, (v) a video device, (vi) a rain sensor, (vii) a compass sensor, (viii) a trip computer, (ix) an intrusion detector, (x) a phone, (xi) an interior light, (xii) a seat occupancy detector, (xiii) a phone attachment, (xiv) an electro-optic reflective mirror element, (xv) an electrochromic reflective mirror element, (xvi) a headlamp controller, (xvii) a printer, (xviii) a transmitter/receiver, (xix) a modem, (xx) an instrumentation light, (xxi) a console light, (xxii) a solar panel, (xxiii) a windshield portion defogger device, (xxiv) an antenna, (xxv) a loudspeaker, (xxvi) a microphone, (xxvii) a digital message recorder, (xxviii) a magnetic tape message recorder, (xxix) a phone control panel, (xxx) a digital storage device, and (xxxi) a GPS/navigational system.

42. The interactive vehicular mirror system according to claim 36, wherein said first and second touch sensitive elements are sensitive to touching by a human finger.

43. The interactive vehicular mirror system according to claim 36, wherein said display element is disposed behind said reflective element.

44. The interactive vehicular mirror system according to claim 43, wherein said reflective element comprises a transreflective element, said display element being disposed behind said transreflective element and viewable through said transreflective element when said display element is actuated.

45. The interactive vehicular mirror system according to claim 36, further comprising a plurality of display elements.

46. The interactive vehicular mirror system according to claim 45, wherein each of said display elements is reconfigurable such that each display element can display more than one display.

* * * * *

UNITED STATES PATENT AND TRADEMARK OFFICE
CERTIFICATE OF CORRECTION

PATENT NO. : 7,224,324 B2
APPLICATION NO. : 09/817874
DATED : May 29, 2007
INVENTOR(S) : Quist et al.

It is certified that error appears in the above-identified patent and that said Letters Patent is hereby corrected as shown below:

Column 5
Line 47, "and" should be --arm--

Column 8
Line 22, "reverence" should be --reference--
Line 60, "electroluminscent" should be --electroluminescent--

Column 10
Lines 7, 8, 9, and 10, "Nos." should be --No.--

Column 12
Line 9 and 42, "electroluminscent" should be --electroluminescent--

Column 13
Line 29, "Lyman" should be --Lynam--
Line 33, "at al.," should be --et al.--

Column 14
Line 14, insert --of-- before "moisture"
Line 24, "No." should be --Nos.--

Column 16
Claim 3, Line 1, "the interactive" should be --The interactive--

Column 17
Claim 18, Line 5, "telephonic" should be --telephone--

Column 18
Claim 27, Line 13, "dissolved" should be --displayed--
Claim 29, Line 32, "wailer" should be --trailer--
Claim 31, Line 48, delete "elements" after --display--

Column 19
Claim 36, Line 42, "en-located" should be --co-located--

UNITED STATES PATENT AND TRADEMARK OFFICE
CERTIFICATE OF CORRECTION

PATENT NO.       : 7,224,324 B2
APPLICATION NO.  : 09/817874
DATED            : May 29, 2007
INVENTOR(S)      : Quist et al.

It is certified that error appears in the above-identified patent and that said Letters Patent is hereby corrected as shown below:

Column 20
Claim 37, Line 1, "display." should be --display,--

Signed and Sealed this

Sixth Day of January, 2009

JON W. DUDAS
*Director of the United States Patent and Trademark Office*